United States Patent
Mu

(10) Patent No.: US 12,219,607 B2
(45) Date of Patent: Feb. 4, 2025

(54) METHOD AND APPARATUS FOR RANDOM ACCESS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 351 days.

(21) Appl. No.: 17/622,731

(22) PCT Filed: Jun. 26, 2019

(86) PCT No.: PCT/CN2019/093037
§ 371 (c)(1),
(2) Date: Dec. 24, 2021

(87) PCT Pub. No.: WO2020/258080
PCT Pub. Date: Dec. 30, 2020

(65) Prior Publication Data
US 2022/0167428 A1    May 26, 2022

(51) Int. Cl.
*G16Y 10/70* (2020.01)
*G16Y 10/75* (2020.01)
(Continued)

(52) U.S. Cl.
CPC ......... *H04W 74/0833* (2013.01); *H04W 4/70* (2018.02); *H04W 28/0215* (2013.01); *H04W 72/0446* (2013.01); *H04W 72/0453* (2013.01); *H04W 72/51* (2023.01); *H04W 74/002* (2013.01); *H04W 74/0866* (2013.01);
(Continued)

(58) Field of Classification Search
CPC . G16Y 10/70–75; H04L 5/0001–0098; H04W 4/50–70; H04W 8/18–245; H04W 28/02–26; H04W 36/0005–385; H04W 48/02–20; H04W 56/001–0025; H04W 72/02–569; H04W 74/002–0891; H04W 76/10–50; H04W 84/005–22; H04W 88/02–12; H04W 92/02–04; H04W 92/10
See application file for complete search history.

(56) References Cited

U.S. PATENT DOCUMENTS

2015/0156760 A1* 6/2015 Yu .................... H04W 74/0833
2017/0013391 A1* 1/2017 Rico Alvarino .. H04W 74/0833
(Continued)

FOREIGN PATENT DOCUMENTS

CN    103220811 A    7/2013
CN    103379656 A    10/2013

OTHER PUBLICATIONS

PCT/CN2019/093037 International Search Report dated Mar. 27, 2020, 2 pages.
(Continued)

*Primary Examiner* — Timothy J Weidner
(74) *Attorney, Agent, or Firm* — Cozen O'Connor

(57) ABSTRACT

A random access method and apparatus. The method is applied to an Internet of Things (IoT) device, and includes: determining a dedicated random access resource, in which the dedicated random access resource is a resource dedicated for the IoT device to initiate a random access; and sending a random access request through the dedicated random access resource.

20 Claims, 7 Drawing Sheets

(51) Int. Cl.
| | |
|---|---|
| *H04W 4/70* | (2018.01) |
| *H04W 28/02* | (2009.01) |
| *H04W 72/0446* | (2023.01) |
| *H04W 72/0453* | (2023.01) |
| *H04W 72/51* | (2023.01) |
| *H04W 74/00* | (2009.01) |
| *H04W 74/08* | (2024.01) |
| *H04W 74/0833* | (2024.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .............. *G16Y 10/70* (2020.01); *G16Y 10/75* (2020.01); *H04W 84/02* (2013.01); *H04W 88/02* (2013.01); *H04W 88/08* (2013.01); *H04W 92/02* (2013.01); *H04W 92/10* (2013.01)

(56) References Cited

U.S. PATENT DOCUMENTS

2017/0280484 A1\* 9/2017 Awad ................ H04W 74/0833
2020/0211290 A1\* 7/2020 Choi ................. H04W 74/0833

OTHER PUBLICATIONS

Chinese Patent Application No. 2019800011755, First Office Action dated Mar. 31, 2022, 5 pages.

Chinese Patent Application No. 2019800011755, English translation of First Office Action dated Mar. 31, 2022, 5 pages.

\* cited by examiner

METHOD AND APPARATUS FOR RANDOM ACCESS

CROSS-REFERENCE TO RELATED APPLICATION

This application is a US national phase application of International Application No. PCT/CN2019/093037, filed on Jun. 26, 2019, the entire contents of which are incorporated herein by reference.

TECHNICAL FIELD

The disclosure relates to a field of communications technologies, and particularly to a method and an apparatus for random access.

BACKGROUND

An Internet of Things (IoT) technology is increasingly applied in a 5G new radio (NR) system.

It is one of the urgent problems to be solved how to ensure that the IoT device works normally in a random access process in a 5G NR system.

SUMMARY

In order to overcome the problems existing in the related art, the disclosure relates to a method and an apparatus for random access.

According to embodiments of the disclosure, a method for random access is provided. The method is applied to an Internet of Things (IoT) device, and includes: determining a dedicated random access resource, in which the dedicated random access resource is a resource dedicated for the IoT device to initiate a random access; and sending a random access request through the dedicated random access resource.

According to embodiments of the disclosure, a method for random access is provided. The method is applied to a network device, and includes: acquiring a random access request sent by an Internet of Things (IoT) device using a dedicated random access resource, the dedicated random access resource being a resource dedicated for the IoT device to initiate a random access; determining that the random access request is sent by the IoT device based on the dedicated random access resource used by the random access request; and sending a random access response, a control channel resources set (CORESET) occupied by a physical downlink control channel (PDCCH) for the random access response meets the capability requirement of the IoT device.

According to embodiments of the disclosure, an apparatus for random access is provided. The apparatus is applied to an Internet of Things (IoT) device, and includes: a processor; a memory for storing instructions executable by the processor; in which the processor is configured to: determine a dedicated random access resource, the dedicated random access resource being a resource dedicated for the IoT device to initiate random access; and send a random access request using the dedicated random access resource.

It should be understood that, the above general descriptions and latter detailed descriptions are only illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

In the related arts, the IoT technology is mainly for a medium-low end IoT device in a low-rate high-latency scenario, however, the 5G NR is generally designed for a high-end terminal in a high-rate low-latency scenario. Therefore, when the IoT device is in communication in a 5G NR system, a communication failure caused by an insufficient processing capacity often occurs. For example, in a random access process, for relatively high-end terminals, the bandwidth of the terminals is relatively wide, and the processing capability is relatively strong. However, when the low-end IoT device is added in a 5G NR system, the network device (for example, a base station) cannot identify a low-end IoT device in a random access process, which may cause the IoT device unable to work.

The technical solution according to the embodiments of the disclosure may include the following beneficial effect. A random access request may be sent using the dedicated random access resource, the dedicated random access resource is a resource dedicated for an IoT device to initiate random access. It may be identified that the random access request is sent by the IoT device based on the dedicated random access resource. A random access response is sent, a CORESET occupied by a physical downlink control channel (PDCCH) of the random access response meeting the capability requirements of the IoT device, so that the IoT device works normally in the random access process.

Figure 1:
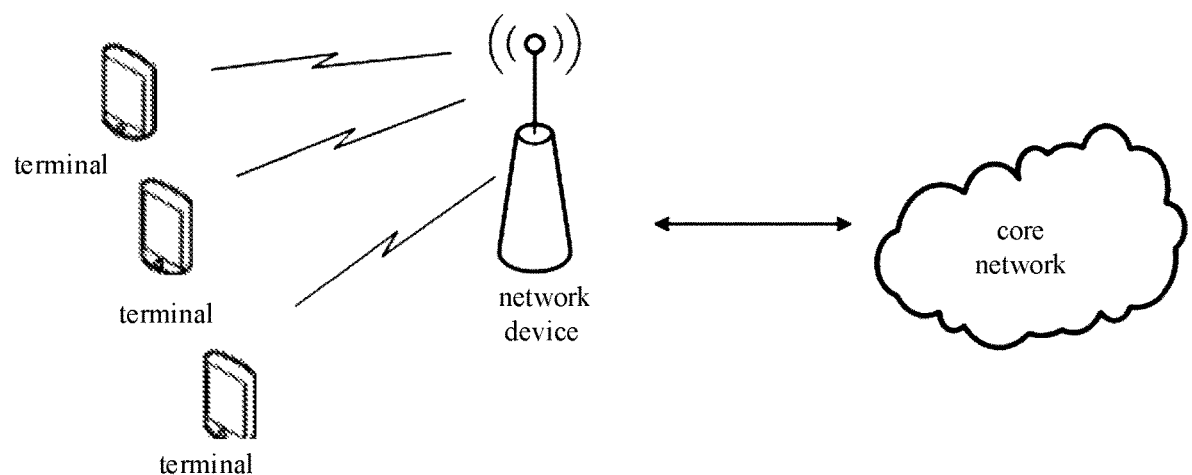
FIG. 1 is a diagram illustrating a wireless communication system according to a part of example embodiments.

The disclosure provides a method for random access. The method may be applied to a wireless communication system as illustrated in FIG. 1. As illustrated in FIG. 1, the terminal accesses a network through a network device such as a base station, and the network device completes data backhaul and fronthaul with a core network to perform various communication services.

It may be understood that, a wireless communication system is a network that provides a wireless communication function. A wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), Carrier Sense Multiple Access with Collision Avoidance. Based on the capacity, rate and latency of different networks, a network is divided into a 2G network, a 3G network, a 4G network or a future evolution of the 4G network, for example, a 5G network. The 5G network may be referred to as a new radio (NR) network. For the convenience of description, in the disclosure, a wireless communication network may be referred to as a network or a system. The network in the disclosure may include a radio access network (RAN) and a core network (CN). The network may include a network device, the network device may be a wireless access network node, a core network device, etc. A wireless access network node also may be referred to as a base station. The network may provide network services for a terminal through the network device, and different operators may provide different network services for a terminal, and it also may be understood that different operators correspond to different operator networks.

A terminal, also may be referred to as user equipment (UE), a mobile station (MS), a mobile terminal (MT), etc., is a device that provides voice and/or data connectivity for a user, for example, a terminal may be a handheld device, a vehicle device, etc. with a wireless connection function. At present, some terminals, for example, may be a mobile phone, a pocket personal computer (PPC), a handheld computer, a personal digital assistant (PDA), a laptop, a tablet, a wearable device, or a vehicle device.

The terminal first acquires a synchronization broadcast block to obtain a synchronization and system information when preparing to access a system. Then, a random access preamble is sent in a physical random access channel (PRACH) corresponding to the acquired synchronous broadcast block. And, the terminal may select a corresponding random access preamble based on a size of a message 3 (Msg. 3) to be sent. For example, when the size of the Msg. 3 is greater than a set threshold, preamble 32~preamble 63 are selected, and when the size of Msg. 3 is smaller than the set threshold, a certain one of preamble 0~preamble 31 is selected. After the user sends a preamble, the network device feeds back a random access response to a terminal. The random access responses of a plurality of terminals may be multiplexed in one PDSCH.

The current random access process is for a high-end terminal, the bandwidth of the high-end terminal is relatively wide, and the processing capability is relatively strong. However, the IoT device in IoT technologies such as narrow band Internet of Things (NB-IoT) and machine type communications (MTC) is mainly aimed at a low-rate high-latency scenario, which generally meets the requirements of low cost, low complexity, coverage enhancement and power enhancement to a certain degree. For example, scenarios such as meter reading, environmental monitoring, etc. At present, the NB-IoT may only support a maximum rate of several hundred kilobytes, and the MTC may only support a maximum rate of a few megabytes. And with the continuous development of IoT services, such as video monitoring, smart home, wearable devices, industrial sensing monitoring, the services generally require a rate of tens to 100 M, and also have a relatively high requirement for latency.

When an IoT device terminal is added to a system, the processing capability of each terminal in a system is different, and if the previous random access response is multiplexed, the network device cannot identify a low-end IoT device in the random access process, so that the IoT device cannot work. For example, a random access response transmitted by a network device such as a base station exceeds a receiving bandwidth of the IoT device, or the size of the random access response transport block exceeds the processing capability of the IoT device, etc.

For this purpose, the embodiment of the disclosure provides a method for random access. In the method for random access, a terminal reports capacity information, and the network device identifies an IoT device based on the capacity information, and further a scheduling method suitable for an IoT device is adopted for the IoT device, for example, a CORESET occupied by a physical downlink control channel (PDCCH) for the random access response meets the capability requirements of the IoT device, so that the IoT device works normally in the random access process.

In an example embodiment of the disclosure, a dedicated random access resource is allocated for an IoT device, the dedicated random access resource being a resource dedicated for an IoT device to initiate random access. The terminal initiates a random access process through the dedicated random access resource, and the network device identifies an IoT device in the random access process through the dedicated random access resource, and further a scheduling method suitable for an IoT device is adopted for the IoT device, for example, a CORESET occupied by a physical downlink control channel (PDCCH) for the random access response meets the capability requirements of the IoT device, so that the IoT device works normally in the random access process.

Figure 2:
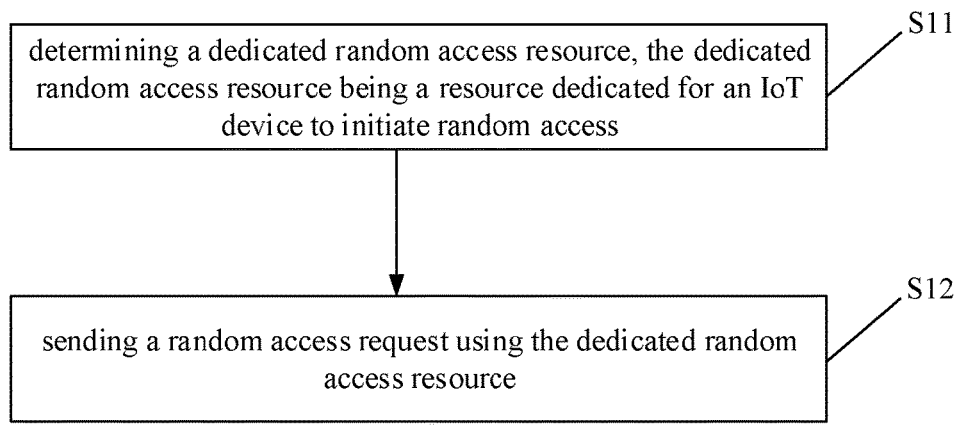
FIG. 2 is a flowchart illustrating a method for random access according to an example embodiment.

FIG. 2 is a flowchart illustrating a method for random access according to an example embodiment. As illustrated in FIG. 1, the method for random access is applied to a terminal. The terminal may be an IoT device, and includes block S11 and block S12.

At block S11, a dedicated random access resource is determined.

In the disclosure, the dedicated random access resource is a resource dedicated for an IoT device to initiate random access.

It may be understood that, a dedicated random access resource of an IoT device is different from a random access resource of a common terminal. The common terminal is a terminal different from the IoT device. The common terminal may be understood as other terminal different from an IoT device in the process of initiating random access.

At block S12, a random access request is sent using the dedicated random access resource.

In the disclosure, the IoT device sends a random access request using the dedicated random access resource in the process of initiating random access, so that a network device such as a subsequent base station may identify an IoT device based on the dedicated random access resource used by a random access request, and a scheduling method suitable for an IoT device is adopted for the IoT device, for example, a CORESET occupied by a physical downlink control channel (PDCCH) for the random access response meets the capability requirements of the IoT device, so that the IoT device works normally in the random access process.

In the disclosure, the above dedicated random access resource is described in combination with practical applications.

On one hand, the dedicated random access resource for the IoT device may be a time resource for sending a random access preamble, the time resource for sending a random access preamble being different from a time resource for sending by a common terminal a random access preamble. For example, the dedicated random access resources allocated for the IoT are a subframe 8 and a subframe 9, in this case, an IoT device sends a random access preamble at the subframe 8 and the subframe 9, and performs random access. A common terminal sends a random access preamble at other subframes different from the subframe 8 and the subframe 9 to perform random access.

On another hand, the dedicated random access resource for the IoT device may be a frequency resource. The frequency resource allocated for the IoT device is different from a frequency resource occupied by a common terminal. For example, the dedicated random access resources allocated for the IoT are physical resource blocks (PRB) 0~PRB 5, in this case, an IoT device sends a random access preamble at the PRB0~PRB 5, and performs random access. A common terminal sends a random access preamble at other PRBs (PRB6~PRB 11) different from PRB0~PRB 5 to perform random access.

On another hand, the dedicated random access resource for the IoT device may be a resource occupied by a random access preamble. A resource occupied by a random access preamble of an IoT device is different from a resource occupied by a random access preamble of a common terminal. For example, the dedicated random access resources allocated for the IoT are preamble1~preamble10, the IoT device occupies preamble1~preamble10 to perform random access. And a common terminal occupies other preambles (preamble11~preamble 63) different from preamble1~preamble10 to perform random access.

In one example embodiment of the disclosure, the dedicated random access resource may be preconfigured by a network device, and broadcast by system information to an IoT device. The IoT device determines a dedicated random access resource based on the system information broadcast by the network device and initiates a random access process using the dedicated random access resource.

Figure 3:
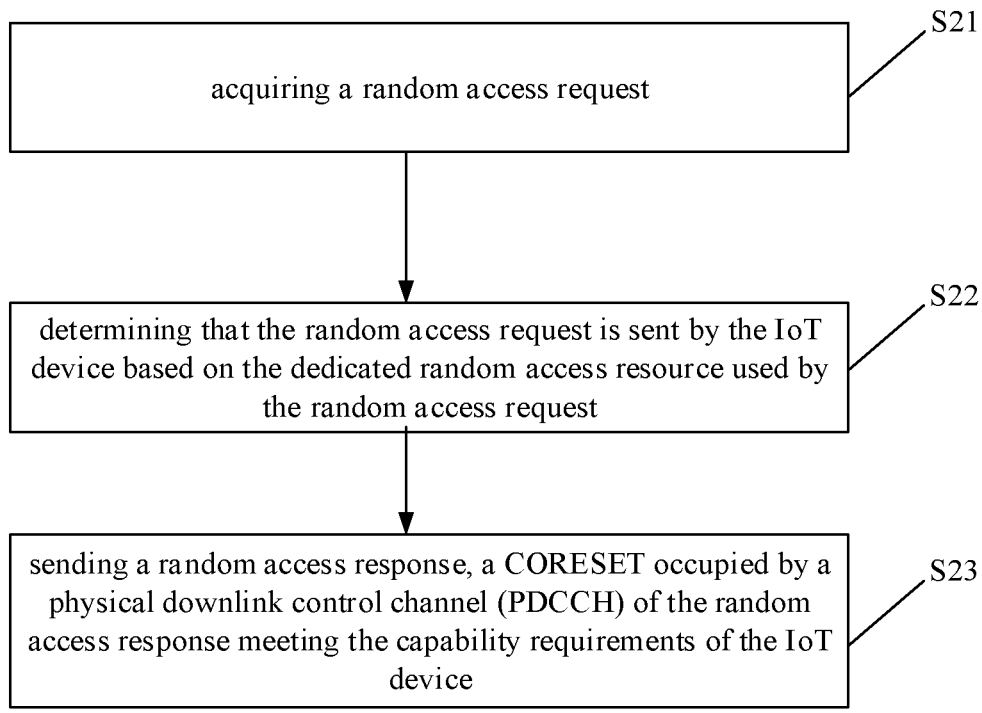
FIG. 3 is a flowchart illustrating a method for random access according to another example embodiment.

FIG. 3 is a flowchart illustrating a method for random access according to an example embodiment. As illustrated in FIG. 3, the method for random access may be applied to a network device. The network device may be a base station, and includes block S21 to block S22.

At block S21, a random access request is acquired.

In a random access process, the random access request acquired by a network device may be a random access request sent by a common terminal, or may be a random access request sent by an IoT device.

In the disclosure, the IoT device sends a random access request using the dedicated random access resource, the dedicated random access resource being a resource dedicated for an IoT device to initiate random access. In one implementation, the dedicated random access resource is a time resource for sending a random access preamble, the time resource for sending a random access preamble being different from a time resource for sending by a common terminal a random access preamble. In another implementation, the dedicated random access resource is a frequency resource, the frequency resource being different from a frequency resource occupied by a common terminal. In another implementation, the dedicated random access resource is a resource occupied by a random access preamble, the resource occupied by a random access preamble being different from a resource occupied by a random access preamble of a common terminal.

In the disclosure, the network device may broadcast a dedicated random access resource through the system information. The IoT device may determine a dedicated random access resource through system information.

The disclosure mainly describes that an IoT device sends a random access request, and the process of initiating a random access request by a common terminal is not described in detail herein.

At block S22, it is determined that the random access request is sent by the IoT device based on the dedicated random access resource used by the random access request.

In the disclosure, the network device may determine whether the terminal initiating a random access request is a common terminal or an IoT device based on the random access resource used by the received random access request. The dedicated random access resource is a resource dedicated for an IoT device, and when the random access resource for sending a random access request is a dedicated random access resource, it is determined that the random access request is sent by the IoT device.

At block S23, a random access response is sent, a CORESET occupied by a physical downlink control channel (PDCCH) of the random access response meeting the capability requirements of the IoT device.

In the disclosure, the network device may determine whether to send a random access response that meets the capacity requirement of the IoT device based on the detection result of the IoT device. The disclosure mainly describes that the network device identifies an IoT device.

In the disclosure, the network device identifies an IoT device, and for an IoT device sending a random access response, a control channel resource set (CORESET) occupied by a physical downlink control channel (PDCCH) for the random access response meets the capability requirements of the IoT device.

On one hand, the CORESET meeting the capability requirements of the IoT device may be that an occupied bandwidth allocated by the CORESET is smaller than or equal to a bandwidth supported by the IoT device. On another hand, the CORESET meeting the capability requirements of the IoT device also may be that a size of a transport block allocated by the CORESET is smaller than or equal to a size of a transport block supported by the IoT device.

In the disclosure, a network device may send a random access response in the following ways:

Way one: a random access response is sent based on a PDSCH same as a common terminal.

In the disclosure, a random access response of the IoT device and a random access response of the common terminal may be multiplexed in the same physical downlink shared channel (PDSCH). In order to meet the capacity requirements of the IoT device, when the network device configures a CORESET of the PDCCH of a random access response, the CORESET meets the capacity requirements of the IoT device, for example, an occupied bandwidth allocated is smaller than or equal to a bandwidth supported by the IoT device; and/or a size of a PDSCH transport block is smaller than or equal to a size of a transport block supported by the IoT device.

Way Two: a random access response is sent based on a PDSCH different from that of a common terminal.

In the disclosure, a random access response of an IoT device and a random access response of a common terminal may be separately transmitted. In this case, in order to meet the capacity requirements of the IoT device, the network device needs to configure a CORESET for the IoT device and a common terminal respectively, and the CORESET allocated for the IoT device meets the capacity requirements of the IoT device. The PDCCH of the PDSCH of a random access response for scheduling an IoT device may be transmitted in a CORESET allocated for the IoT device.

In the disclosure, by separately configuring a CORESET for the IoT device, a limitation of scheduling the IoT device on scheduling a common terminal may be reduced.

In an example embodiment, the CORESET allocated for the IoT device in the disclosure may be preconfigured by a system or broadcast by system information. For example, the CORESET of the IoT device may be configured in a system information block (SIB) 1 in the disclosure.

Figure 4:
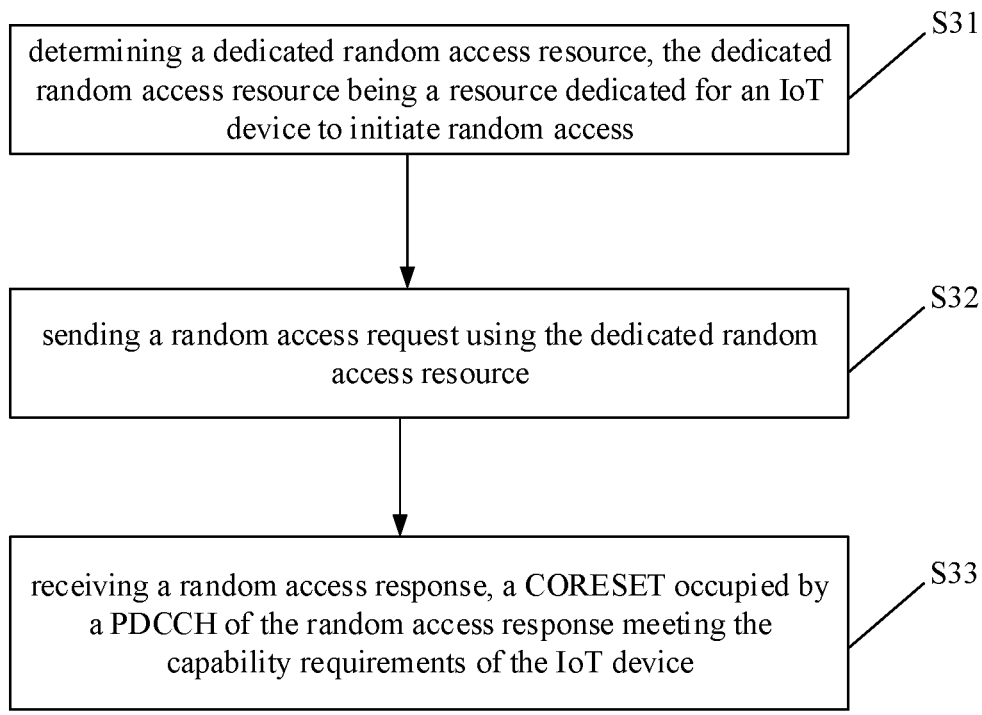
FIG. 4 is a flowchart illustrating a method for random access according to another example embodiment.

FIG. 4 is a flowchart illustrating a method for random access according to an example embodiment. As illustrated in FIG. 4, the method for random access may be applied to a terminal, and the terminal may be an IoT device, and includes block S31 and block S32.

At block S31, a dedicated random access resource is determined, the dedicated random access resource being a resource dedicated for an IoT device to initiate random access.

At block S32, a random access request is sent using the dedicated random access resource.

At block S33, a random access response is received, a CORESET occupied by a physical downlink control channel (PDCCH) of the random access response meeting the capability requirements of the IoT device.

The CORESET meeting the capability requirements of the IoT device may include: an occupied bandwidth allocated by the CORESET is smaller than or equal to a bandwidth supported by the IoT device; and/or a size of a transport block allocated by the CORESET is smaller than or equal to a size of a transport block supported by the IoT device.

In one implementation, receiving a random access response includes: receiving the random access response based on a PDSCH same as a common terminal, or receiving the random access response based on a PDSCH different from that of a common terminal.

In one implementation, the CORESET occupied by a PDCCH of the random access response is preconfigured by a system. In another implementation, the IoT device also may determine a CORESET occupied by a PDCCH of the random access response by receiving system information broadcast by a network device. For example, the SIM may acquire a CORESET occupied by a PDCCH of the random access response.

In another implementation, the random access response includes scheduling information of an Msg.3. The method for random access in the disclosure further includes block S34.

At block S34, an Msg.3 is sent by the scheduling information included in the random access response.

In the disclosure, the random access response includes scheduling information of an Msg.3. The network device configures scheduling information of an Msg.3 matching the IoT device capacity for the IoT device. The IoT device sends an Msg.3 by the scheduling information included in the random access response, and the network device receives an Msg.3 sent by the IoT device by the scheduling information included in the random access response.

Figure 5:
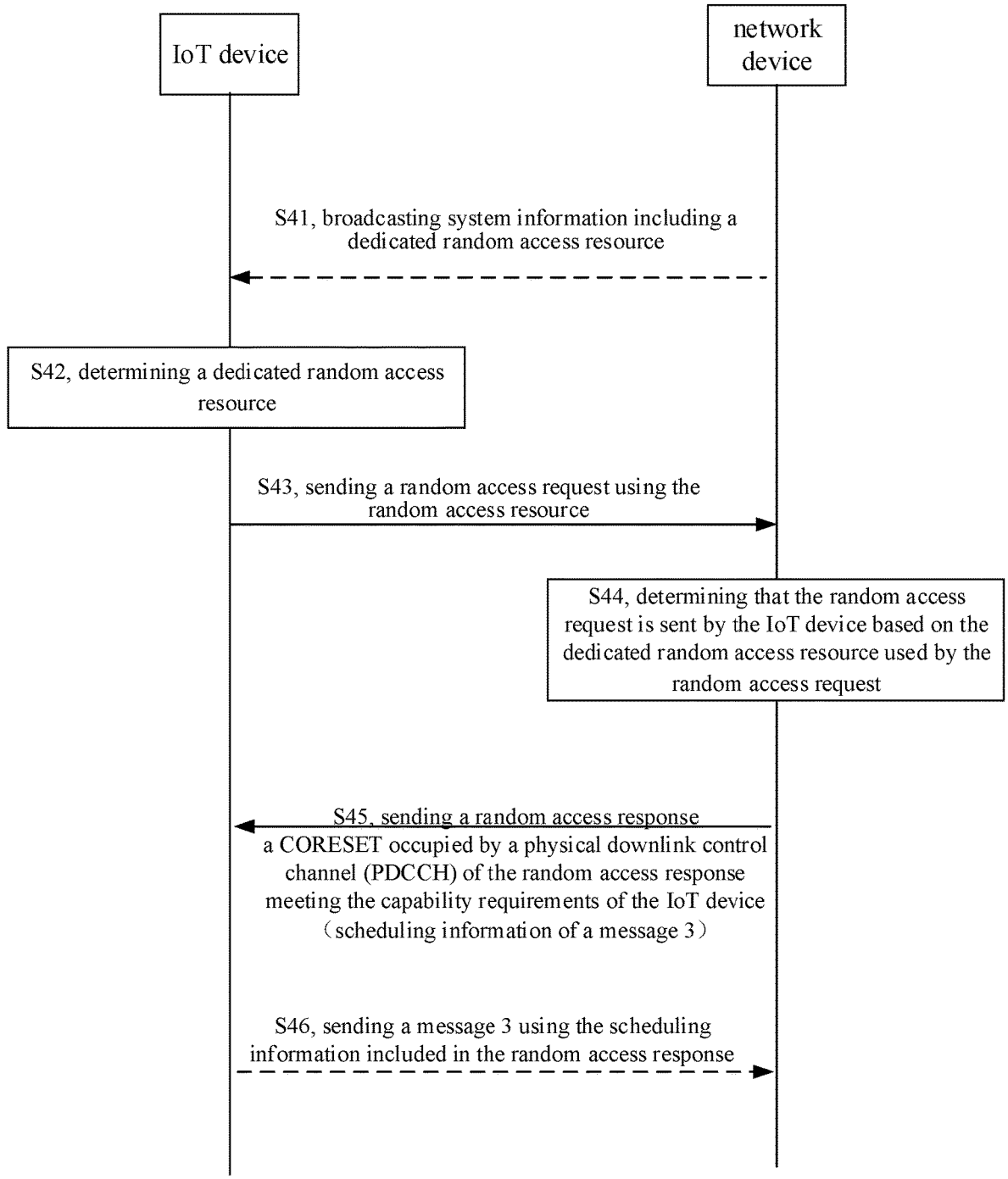
FIG. 5 is a flowchart illustrating a method for random access according to another example embodiment.

FIG. 5 is a flowchart illustrating a method for random access according to an example embodiment. As illustrated in FIG. 5, the method for random access is a diagram of a method for interaction between an IoT device and a network device. As illustrated in FIG. 5, the method includes block S41 to block S46.

At block S41, a network device broadcasts system information including a dedicated random access resource.

It may be understood that, block S41 is an optional block, and the dedicated random access resource may be predefined in an IoT device.

At block S42, an IoT device determines a dedicated random access resource.

The dedicated random access resource is a time resource for sending a random access preamble, the time resource for sending a random access preamble being different from a time resource for sending by a common terminal a random access preamble; or the dedicated random access resource is a frequency resource, the frequency resource being different from a frequency resource occupied by a common terminal; or the dedicated random access resource is a resource occupied by a random access preamble, the resource occupied by a random access preamble being different from a resource occupied by a random access preamble of a common terminal.

At block S43, an IoT device sends a random access request using the random access resource, and a network device acquires a random access request.

At block S44, a network device determines that the random access request is sent by the IoT device based on the dedicated random access resource used by the random access request.

At block S45, the network device sends a random access response and the IoT device receives the random access response, a CORESET occupied by a physical downlink control channel (PDCCH) of the random access response meeting the capability requirements of the IoT device.

The CORESET meeting the capability requirements of the IoT device may include: an occupied bandwidth allocated by the CORESET is smaller than or equal to a bandwidth supported by the IoT device; and/or a size of a transport block allocated by the CORESET is smaller than or equal to a size of a transport block supported by the IoT device.

In one implementation, the network device sends the random access response based on a physical downlink shared channel (PDSCH) same as a common terminal. In another implementation, the network device sends the random access response based on a PDSCH different from that of a common terminal.

In an example embodiment, the CORESET allocated for the IoT device in the disclosure may be preconfigured by a system or broadcast by system information. For example, the CORESET of the IoT device may be configured in a system information block (SIB) 1 in the disclosure.

Further, the random access response includes scheduling information of an Msg.3. The method for random access in the disclosure further includes block S46.

At block S46, the IoT device sends an Msg.3 by the scheduling information included in the random access response. The network device acquires the Msg.3 sent by the IoT device by the scheduling information included in the random access response.

In the method for random access in the disclosure, the IoT device sends a random access request using the dedicated random access resource, the dedicated random access resource being a resource dedicated for an IoT device to initiate random access. The network device may identify that a random access request is sent by an IoT device based on the dedicated random access resource, and send a random access response. A CORESET occupied by a physical downlink control channel (PDCCH) for the random access response meets the capability requirements of the IoT device, so that the IoT device works normally in the random access process.

Based on the same conception, the embodiment of the disclosure further provides an apparatus for random access.

It may be understood that the apparatus for random access in the embodiment of the disclosure includes hardware structures and/or software modules that perform each function in order to achieve the above functions. The units and algorithm blocks of the examples disclosed in connection with the embodiments may be achieved by a hardware or a combination of a hardware and a computer software. Whether a certain function is performed by a hardware or a computer software driving a hardware depends on particular applications and design constraints of the technical solution. Those skilled in the art may achieve the described functions for each particular application with different methods within the scope of the technical solution in embodiments of the disclosure.

Figure 6A:
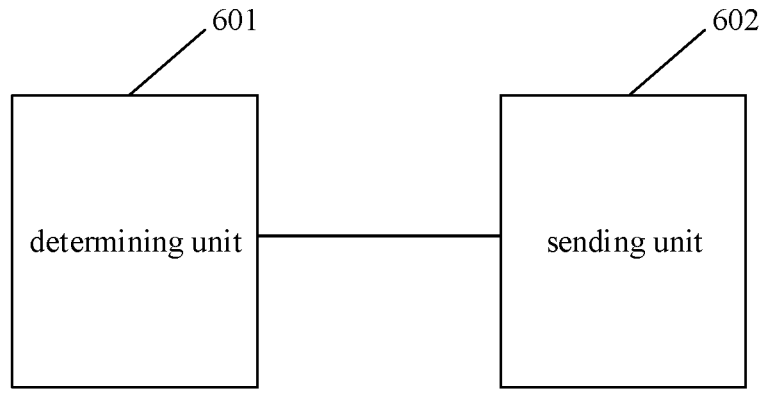
FIGS. 6A-6B are block diagrams illustrating an apparatus for random access according to an example embodiment.

FIG. 6A is a block diagram illustrating an apparatus 600 for random access according to an example embodiment. As illustrated in FIG. 6A, the apparatus 600 is applied to an IoT device, and includes a determining unit 601 and a sending unit 602. The determining unit 601 is configured to determine a dedicated random access resource, the dedicated random access resource being a resource dedicated for an IoT device to initiate random access. The sending unit 602 is configured to send a random access request using the dedicated random access resource.

In one implementation, the dedicated random access resource is a time resource for sending a random access preamble, the time resource for sending a random access preamble being different from a time resource for sending by a common terminal a random access preamble. In another implementation, the dedicated random access resource is a frequency resource, the frequency resource being different from a frequency resource occupied by a common terminal. In another implementation, the dedicated random access resource is a resource occupied by a random access preamble, the resource occupied by a random access preamble being different from a resource occupied by a random access preamble of a common terminal.

The common terminal is a terminal different from the IoT device.

In another implementation, the determining unit 601 is configured to determine a dedicated random access resource based on the system information.

Figure 6B:
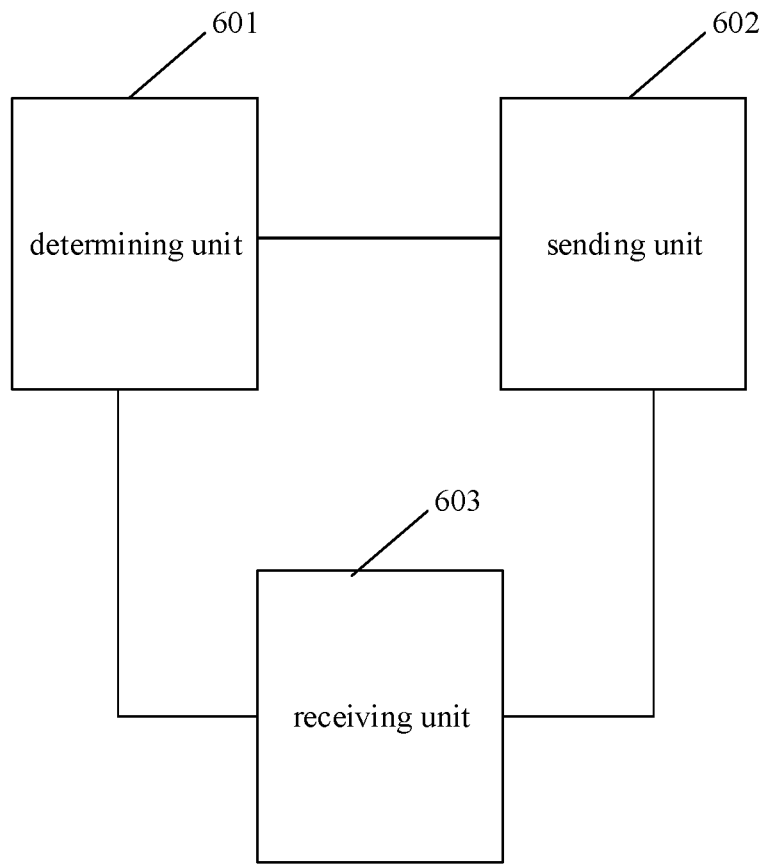

In another implementation, the apparatus 600 further includes a receiving unit 603 as illustrated in FIG. 6B. The receiving unit 603 is configured to: after the sending unit 602 sends a random access request, receive a random access response, a CORESET occupied by a physical downlink control channel (PDCCH) of the random access response meeting the capability requirements of the IoT device.

The CORESET meeting the capability requirements of the IoT device may include: an occupied bandwidth allocated by the CORESET is smaller than or equal to a bandwidth supported by the IoT device; and/or a size of a transport block allocated by the CORESET is smaller than or equal to a size of a transport block supported by the IoT device.

In another implementation, the receiving unit 603 is configured to receive a random access response based on a PDSCH same as a common terminal. In another implementation, the receiving unit 603 is configured to receive a random access response based on a PDSCH different from that of a common terminal.

In another implementation, the CORESET occupied by a PDCCH of the random access response is preconfigured by a system, or configured by system information.

In another implementation, the random access response includes scheduling information of an Msg.3. The sending unit 602 is further configured to: send an Msg.3 by the scheduling information included in the random access response.

Figure 7:
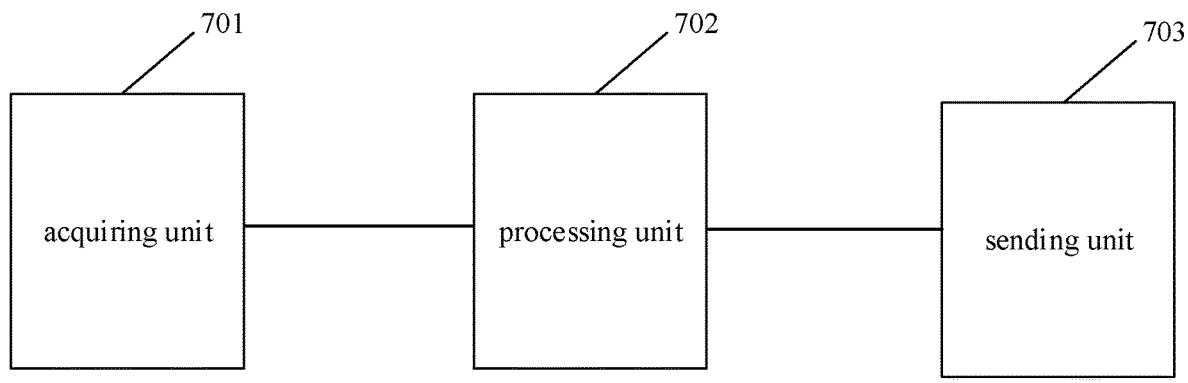
FIG. 7 is a block diagram illustrating an apparatus for random access according to another example embodiment.

FIG. 7 is a block diagram illustrating an apparatus 700 for random access according to an example embodiment. As illustrated in FIG. 7, the apparatus 700 is applied to a network device. The apparatus 700 includes an acquiring unit 701, a processing unit 702 and a sending unit 703. The acquiring unit 701 is configured to acquire a random access request sent by an Internet of Things (IoT) device using a dedicated random access resource, the dedicated random access resource being a resource dedicated for an IoT device to initiate random access. The processing unit 702 is configured to determine that the random access request is sent by the IoT device based on the dedicated random access resource used by the random access request. The sending unit 703 is configured to send a random access response, a CORESET occupied by a physical downlink control channel (PDCCH) of the random access response meeting the capability requirements of the IoT device.

In one implementation, the dedicated random access resource is a time resource for sending a random access preamble, the time resource for sending a random access preamble being different from a time resource for sending by a common terminal a random access preamble; or the dedicated random access resource is a frequency resource, the frequency resource being different from a frequency resource occupied by a common terminal; or the dedicated random access resource is a resource occupied by a random access preamble, the resource occupied by a random access preamble being different from a resource occupied by a random access preamble of a common terminal.

The common terminal is a terminal different from the IoT device.

In another implementation, the sending unit 703 is further configured to: broadcast a dedicated random access resource based on system information.

In another implementation, the CORESET meeting the capability requirements of the IoT device may include: an occupied bandwidth allocated by the CORESET is smaller than or equal to a bandwidth supported by the IoT device; and/or a size of a transport block allocated by the CORESET is smaller than or equal to a size of a transport block supported by the IoT device.

In another implementation, the sending unit 703 is configured to send a random access response based on a physical downlink shared channel (PDSCH) same as a common terminal. In another implementation, the sending unit 703 is configured to send a random access response based on a PDSCH different from that of a common terminal.

In another implementation, the CORESET occupied by a PDCCH of the random access response is preconfigured by a system, or configured by system information.

In another implementation, the random access response includes scheduling information of an Msg.3. The acquiring unit 701 is further configured to: acquire an Msg.3 sent by the scheduling information.

With regard to the apparatus in the embodiments, the specific way each module performs the operation has been described in detail in the embodiments of the method and will not be elaborated here.

Figure 8:
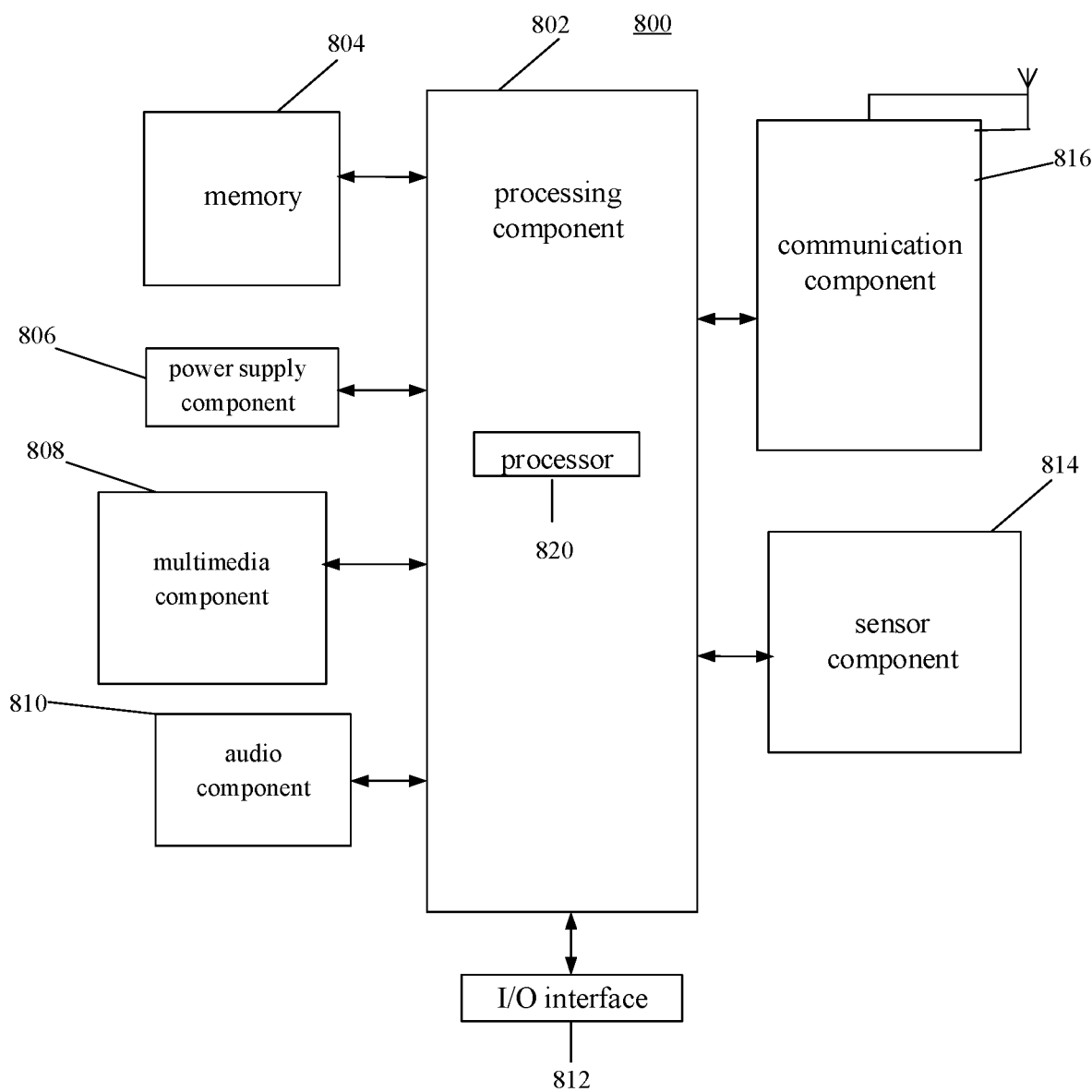
FIG. 8 is a block diagram illustrating an apparatus according to an example embodiment.

FIG. 8 is a block diagram illustrating an apparatus 800 for random access according to an example embodiment. For example, the apparatus 800 may be a mobile phone, a computer, a digital broadcasting terminal, a messaging device, a game console, a tablet device, a medical equipment, a fitness equipment, a personal digital assistant, etc.

Referring to FIG. 8, the apparatus 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the whole operation of the device 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the apparatus 800. Examples of the data include the instructions of any applications or methods operated on the apparatus 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power supply for all components of the apparatus 800. The power supply component 806 may include power supply management system, one or more power supplies, and other units related to generating, managing and distributing power for the apparatus 800.

The multimedia component 808 includes an output interface screen provided between the device 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 includes a front camera and/or a rear camera. When the apparatus 800 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 810 is configured to output and/or input a signal. For example, the audio component 810 includes a microphone (MIC). When the apparatus 800 is in operation mode, such as call mode, record mode, and speech recognition mode, the microphone is configured to receive the external audio signals. The audio signal received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the apparatus 800. For example, the sensor component 814 may detect the on/off state of the apparatus 800 and the relative positioning of the component.

For example, the component is a display and a keypad of the apparatus 800. The sensor component 814 may further detect the location change of the apparatus 800 or one component of the apparatus 800, the presence or absence of contact between the user and the apparatus 800, the orientation or acceleration/deceleration of the apparatus 800, and the temperature change of the apparatus 800. The sensor component 814 may include a proximity sensor configured to detect the existence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the apparatus 800 and other devices. The apparatus 800 may access wireless networks based on communication standard, such as WiFi, 2G or 3G, or their combination. In an example embodiment, the communication component 816 receives a broadcast signal or broadcast-related information from an external broadcast management system via a broadcast channel. In an example embodiment, the communication component 816 further includes a near field communication (NFC) module to facilitate short-range communication. For example, the NFC module may be achieved based on an RFID technology, an IrDA technology, a UWB technology, a BT technology and other technologies.

In an example embodiment, the apparatus 800 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, to perform the above method.

In an example embodiment, the apparatus 800 is applied to an IoT device, and includes: a processor; and a memory configured to store instructions executable by the processor. The processor is configured to execute the method for random access.

In an example embodiment, a non-transitory computer readable storage medium including instructions is further provided, such as a memory 804 including instructions, the instructions may be executed by the processor 820 of the apparatus 800 to complete the above method. For example, the non-transitory computer readable storage medium may be a ROM, a random access memory (RAM), a CD-ROM, a magnetic tape, a floppy disk, an optical data storage device, etc.

Figure 9:
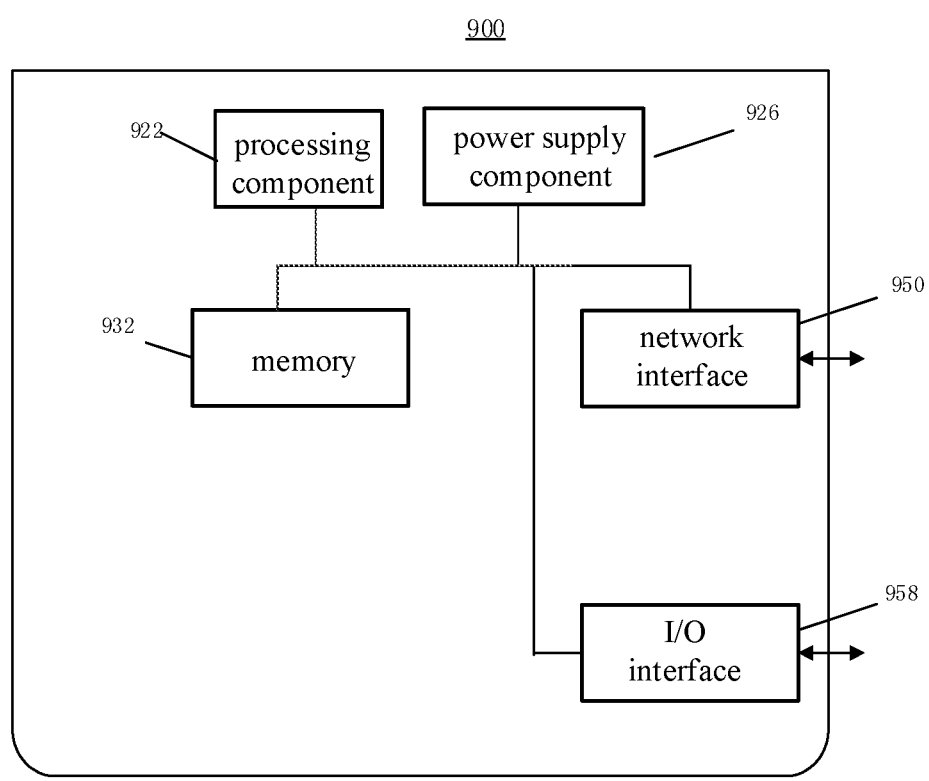
FIG. 9 is a block diagram illustrating an apparatus according to an example embodiment.

FIG. 9 is a block diagram illustrating an apparatus 900 for random access according to an example embodiment. For example, the apparatus 900 may be provided as a network device, for example, a base station. As illustrated in FIG. 9, the apparatus 900 includes a processing component 922, and further includes one or more processors, and resources represented by a memory 932, and instructions executed by a processing component 922, for example, an application. The application stored in the memory 932 may include one or more modules each corresponding to one set of instructions. In addition, the processing component 922 is configured to execute instructions to perform the above method.

The apparatus 900 may further include a power supply component 926 configured to perform power supply management for the apparatus 900, a wired or wireless network interface 950 configured to connect the apparatus 900 to a network, and an input/output (I/O) interface 958. The apparatus may be operated based on an operating system stored in a memory 932, for example, Windows Server™, Mac OS X™, Unix™, Linux™, FreeBSD™.

It may be understood that, "network" and "system" are alternatively used in the disclosure, which may be understood by those skilled in the art.

It may be further understood that, "a plurality of" in the disclosure refers to two or more than two, which is similar to other quantifiers. "and/or" describes an association relationship of the associated objects, and represents that there may be three relationships, for example, A and/or B, may represent: A exists alone, both A and B exist, and B exists alone. The character "/" generally represents an "or" relationship of the associated objects. The singular forms "an", "said" and "the" are also intended to include a plural form, unless the context clearly indicates otherwise.

It will be appreciated that, in the embodiments of the disclosure, although the operations are described in a specific sequence in the drawings, it should not be understood that the operations are required to be performed in the particular sequence shown or in a serial sequence, or that all operations shown are required to be performed to obtain a desired result. In a particular environment, multitasking and parallel processing may be advantageous.

After considering the specification and practicing the disclosure herein, those skilled in the art will easily think of other embodiments of the disclosure. The disclosure is intended to cover any variations, usages, or adaptive changes of the present disclosure. The variations, usages, or adaptive changes follow the general principles of the disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present disclosure is only limited by the appended claims.

What is claimed is:

1. A method for random access, performed by a user equipment (UE), comprising:
   determining a first resource set and a second resource set based on a system information block (SIB) 1, wherein the first resource set and the second resource set are configured for the UE, and an occupied bandwidth allocated by the second resource set is smaller than or equal to a bandwidth supported by the UE, wherein the second resource set comprises a control resource set;
   sending a random access request via the first resource set; and
   receiving a random access response via the second resource set.

2. The method of claim 1, wherein, the first resource set comprises a random access resource.

3. The method of claim 1, wherein, the first resource set comprises a bandwidth resource, or the second resource set comprises a bandwidth resource, or the first resource set comprises a bandwidth resource and the second resource set comprises a bandwidth resource.

4. The method of claim 1, wherein, the second resource set is occupied by a physical downlink control channel (PDCCH).

5. The method of claim 1, wherein the first resource set includes a frequency resource, the frequency resource is different from a frequency resource occupied by a common UE, and the common UE is different from the UE.

6. The method of claim 1, wherein receiving the random access response comprises:
   receiving the random access response based on a physical downlink shared channel (PDSCH) different from a PDSCH of a common UE.

7. The method of claim 1, wherein the UE is a reduced capability device, a reduced bandwidth device, a narrow bandwidth device, or an Internet of Things (IoT) device.

8. The method according to claim 1, wherein the random access response comprises scheduling information of an Msg.3, and the method further comprises:
   sending the Msg.3 via the scheduling information.

9. A non-transitory computer-readable storage medium having stored thereon instructions that, when executed by a processor of a user equipment (UE), cause the UE to perform the method for random access of claim 1.

10. A method for random access, applied to a network device and comprising:
    determining a first resource set and a second resource set based on a system information block (SIB) 1, wherein the first resource set and the second resource set are configured for a user equipment (UE), and an occupied bandwidth allocated by the second resource set is smaller than or equal to a bandwidth supported by the UE, wherein the second resource set comprises a control resource set;
    acquiring a random access request, wherein the random access request is sent by the UE via the first resource set; and
    sending a random access response, wherein the random access response is received by the UE via the second resource set.

11. The method of claim 10, wherein, the first resource set comprises a random access resource.

12. The method of claim 10, wherein the first resource set comprises a bandwidth resource, or the second resource set comprises a bandwidth resource, or the first resource set comprises a bandwidth resource and the second resource set comprises a bandwidth resource.

13. The method of claim 10, wherein, the second resource set is occupied by a physical downlink control channel (PDCCH).

14. The method of claim 10, wherein the first resource set includes a frequency resource, the frequency resource is different from a frequency resource occupied by a common UE, and the common UE is different from the UE.

15. The method of any of claim 10, wherein sending the random access response comprises:
   sending the random access response based on a physical downlink shared channel (PDSCH) different from a PDSCH of a common UE.

16. An apparatus for random access, applied to a network device and comprising:
   a processor;
   a memory for storing instructions executable by the processor;
   wherein the processor is configured to perform the method for random access of claim 10.

17. The method according to claim 10, wherein the UE is a reduced capability device, a reduced bandwidth device, a narrow bandwidth device, or an Internet of Things (IoT) device.

18. The method according to claim 10, wherein the random access response comprises scheduling information of an Msg.3, and the method further comprises:
   acquiring the Msg.3 sent via the scheduling information.

19. A non-transitory computer-readable storage medium having stored thereon instructions that, when executed by a processor of a network device, cause the network device to perform the method for random access of claim 10.

20. An apparatus for random access, applied to a user equipment (UE) and comprising:
   a processor;
   a memory for storing instructions executable by the processor;
   wherein, the processor is configured to:
   determine a first resource set and a second resource set based on a system information block (SIB) 1, wherein the first resource set and the second resource set are configured for the UE, and an occupied bandwidth allocated by the second resource set is smaller than or equal to a bandwidth supported by the UE, wherein the second resource set comprises a control resource set;
   send a random access request via the first resource set; and
   receive a random access response via the second resource set.

* * * * *